US012594580B2

(12) United States Patent
Nazemi et al.

(10) Patent No.: US 12,594,580 B2
(45) Date of Patent: Apr. 7, 2026

(54) ALTERING AND ENHANCING RESONATOR PERFORMANCES USING FREE TO FIXED BOUNDARY RATIO (FFBR) TOPOLOGY

(71) Applicant: University of Windsor, Windsor (CA)

(72) Inventors: Haleh Nazemi, LaSalle (CA); Arezoo Emadi, Windsor (CA)

(73) Assignee: University of Windsor, Windsor (CA)

( * ) Notice: Subject to any disclaimer, the term of this patent is extended or adjusted under 35 U.S.C. 154(b) by 518 days.

(21) Appl. No.: 18/350,825

(22) Filed: Jul. 12, 2023

(65) Prior Publication Data

US 2024/0024918 A1 Jan. 25, 2024

Related U.S. Application Data

(60) Provisional application No. 63/390,656, filed on Jul. 20, 2022.

(51) Int. Cl.
*B06B 1/06* (2006.01)
*B06B 1/02* (2006.01)

(52) U.S. Cl.
CPC .......... *B06B 1/0607* (2013.01); *B06B 1/0292* (2013.01)

(58) Field of Classification Search
CPC ..... B06B 1/0607; B06B 1/0292; G01H 11/08; G01N 29/2406
See application file for complete search history.

(56) References Cited

U.S. PATENT DOCUMENTS

| | | | |
|---|---|---|---|
| 8,952,595 | B2 | 2/2015 | Huang |
| 9,039,976 | B2 | 5/2015 | Sparks et al. |
| 9,238,250 | B2 | 1/2016 | Kandori et al. |
| 9,321,080 | B2 | 4/2016 | Tagaki et al. |
| 9,660,554 | B2 | 5/2017 | Muang |
| 9,925,561 | B2 | 3/2018 | Emadi et al. |
| 10,084,394 | B2 | 9/2018 | Kandori et al. |
| 10,857,567 | B2 | 12/2020 | Singh et al. |
| 2011/0023582 | A1 | 2/2011 | Kupnik et al. |
| 2014/0225476 | A1 | 8/2014 | Degertekin et al. |
| 2014/0360272 | A1 | 12/2014 | Kandori |
| 2016/0077058 | A1 | 3/2016 | Akiyama et al. |
| 2017/0326591 | A1 | 11/2017 | Apte et al. |
| 2018/0202976 | A1 | 7/2018 | Saji |

(Continued)

FOREIGN PATENT DOCUMENTS

| | | |
|---|---|---|
| CN | 110560350 | 12/2019 |
| WO | 2017198666 | 11/2017 |

OTHER PUBLICATIONS

Lee et al., CMUT as a Chemical Sensor for DMMP Detection, IEEE, pp. 434-439, 2008.

(Continued)

*Primary Examiner* — Daniel Pihulic

(74) *Attorney, Agent, or Firm* — Riches, McKenzie & Herbert LLP

(57) ABSTRACT

A resonator and/or transducer comprising at least one deflectable membrane, a fixed substrate, and at least one cavity defined between the at least one deflectable membrane and the fixed substrate. A Free to Fixed Boundary Ratio (FFBR) of the deflectable membrane is selected to optimize a characteristic of the resonator and/or transducer, such as resonant frequency, displacement, operating voltage, electromechanical coupling coefficient, or mass sensitivity.

20 Claims, 7 Drawing Sheets

(56) References Cited

U.S. PATENT DOCUMENTS

| | | | | |
|---|---|---|---|---|
| 2019/0299251 | A1 | 10/2019 | Chen et al. | |
| 2024/0024918 | A1* | 1/2024 | Nazemi | B06B 1/0607 |

OTHER PUBLICATIONS

Haller, et al., A Surface Micromachined Electrostatic Ultrasonic Air Transducer, IEEE Transactions on UltraSonics, Ferroelectrics, and Frequency Control, vol. 43, No. 1, Jan. 1, 1996.
Nazemi, A Miniaturized Chemical Vapor Detector Using MEMS Flexible Platform, University of Windsor, Thesis, 2019.
Lee et al., Mesoporous Thin-Film on Highly-Sensitive Resonant Chemical Sensor for Relative Humidity and CO2 Detection, Analytical Chemistry, 2012, 84, 3063-3066.
Barauskas et al., Greenhouse Gas Molecule CO2 Detection Using a Capacitive Micromachined Ultrasound Transducer, Analytical Chemistry, 2016, 88, 6662-6665.
Nazemi et al., Advanced Micro-and Nano Gas Sensor Technology: A Review, Sensors, 2019.
Brenner et al., Advances in Capacitive Micromachined Ultrasonic Transducers, Micromachines, 2019.
Hu et al., A boundary condition correction for the clamped constraint of elastic plate/beam theory, International Journal of Solids and Structures 124, 2017, 229-234.
Nathani et al., Capacitive Based Micromachined Resonators for Low Level Mass Detection, Micromachines, 2021.
Prud'Homme et al., Comparison between Linear and Branched Polyethylenimine and Reduced Graphene Oxide Coatings as a Capture Layer for Micro Resonant CO2 Gas Concentration Sensors, Sensors, 2020.
Philips Engineering Solutions, Capacitive Micromachined Ultrasonic Transducers, 2023.
Ergun et al., Capacitive Micromachined Ultrasonic Transducers: Fabrication Technology, IEEE Transactions on Ultrasonics, Ferroelectrics, and Frequency Control, vol. 52, No. 12, Dec. 2005.
Ahmed et al., Investigation of stresses at the fixed end of deep cantilever beams, Computers and Structures 69, 1998, 329-338.
Lee et al., Highly Sensitive Detection of DMMP Using a CMUT-based Chemical Sensor, IEEE Sensors, 2010.
Wang et al., Capacitive micromachined ultrasound transducers for intravascular ultrasound imaging, Microsystems & Nanoengineering, 2020.
Khuri-Yakub, et al., Capacitive micromachined ultrasonic transducers for medical imaging and therapy, J Micromech Microeng., May 2011.
Park et al., Capacitive micromachined ultrasonic transducers for chemical detection in nitrogen, Applied Physics Letters, 2007.
Philips, CMUT: a versatile ultrasonic platform developed by Philips, 2019.
Cowen et al., PolyMUMPs Design Handbook, 2011.
Yoon et al., A Capacitive Micromachined Ultrasonic Transducer-Based Resonant Sensor Array for Portable Volatile Organic Compound Detection with Wireless Systems, Sensors, 2019.
American College of Emergency Physicians, Technology CMUT—Capacitive Micromachined Ultrasound Transducers: A Primer, Jun. 12, 2020.
Khuri-Yakub et al., The Capacitive Micromachined Ultrasonic Transducer (CMUT) as a Chem/Bio Sensor, IEEE Ultrasonics Symposium, 2007.
Ergun et al., Capacitive Micromachined Ultrasonic Transducers: Theory and Technology, Journal of Aerospace Engineering, Apr. 2003.
Ilkhechi, Transparent capacitive micromachined ultrasonic transducer (CMUT) arrays for real-time photoacoustic applications, Optics Express, vol. 28, No. 9, Apr. 27, 2020.
Molgaard et al., Sensitivity Optimization of Wafer Bonded Gravimetric CMUT Sensors, IEEE Journal of Microelectromechanical Systems, 2018.

* cited by examiner (a) (b) (c)

ALTERING AND ENHANCING RESONATOR PERFORMANCES USING FREE TO FIXED BOUNDARY RATIO (FFBR) TOPOLOGY

RELATED APPLICATION

This application claims priority to the 20 Jul. 2022 filing date of U.S. Patent Application Ser. No. 63/390,656, which is incorporated herein by reference.

FIELD OF THE INVENTION

This invention relates to resonators and transducers, and more particularly to the use of a Free to Fixed Boundary Ratio (FFBR) to alter and enhance the performance of resonators and/or transducers.

BACKGROUND OF THE INVENTION

Ultrasonic imaging is one of the known techniques in several imaging applications including biomedical science and fault detection applications. The most commonly used transducers are the conventional piezoelectric devices, which have drawbacks including narrow bandwidth and poor acoustic matching. In order to address the aforementioned drawbacks, capacitive micromachined ultrasonic transducers (CMUTs) are proposed, which benefit from advanced microfabrication techniques. Conventional CMUT consists of a deflectable circular top membrane, which is suspended on top of a fixed bottom substrate. Surrounding of the top membrane is fully clamped and the middle of the top membrane deflects towards the substrate due to an applied DC bias voltage, which changes the cavity height. This alters the capacitance of the CMUT. A side view of a conventional CMUT is shown in FIG. 1. The CMUT includes a top membrane 12, a silicon substrate 14, an anchor 18, and a cavity 16.

The conventional CMUT has been recently developed as a resonator for analyte sensing applications when it is functionalized with sensing material 20 chosen based on a target analyte, illustrated in FIG. 2. When such resonator is exposed to the target analyte, sensing material 20 interacts with the target molecules. This changes the mass of the top membrane 12 and consequently its resonant frequency, as this relation is shown in Equation (1). The shift in the resonant frequency is correlated to the analyte concentration.

$$f = \frac{1}{2\pi}\sqrt{\frac{k}{m}} \tag{1}$$

f and k represent frequency and membrane stiffness respectively, when m is total mass of the membrane, sensing material and interacted mass of the target analyte. Stiffness of the membrane can be calculated by Equation 2, $$k = \frac{64\pi E t^3}{3(1-\nu^2)r^2} - \frac{\varepsilon_0 A V_{DC}^2}{h^3} + 4\pi\sigma t, \tag{2}$$

where E, t, ν, r and A represent Young's modulus, thickness, Poisson's ratio, radius and area of the membrane, respectively. $V_{DC}$, h, $\varepsilon_0$ and σ are DC bias voltage, cavity height permittivity and residual stress of the membrane, respectively.

The current designed geometries are fully clamped circular membranes with examples shown in FIGS. 1 and 2. It has been shown in various research that smaller dimensions and lower mass and thickness provide higher frequency, and consequently enhanced sensitivity of the device. However, smaller dimensions impose limitations discussed below.

(1) Decreasing the area reduces the surface, which needs to be further functionalized with sensing material. This reduces the target mass exposure area in applications such as chemical detections, which affects the performance of the device and decreases the sensitivity.

(2) Decreasing the area results in a stiffer structure according to Equation (2), and therefore requires higher operating DC voltage for conventional CMUT. This can lead to integration challenges.

(3) Entirely clamping the structure reduces the design degree of freedom and limits the displacement. Flexibility can be an important parameter in applications such as imaging or gas detection.

SUMMARY OF THE INVENTION

The proposed technology employs a novel parameter in addition to the conventional design criteria in order to enhance the resonator performance. This parameter is free to fixed boundary ratio (FFBR) to achieve desired or optimum resonant frequency or sensitivity of the resonator and/or transducer while a relatively large area does not degrade the performance. Furthermore, this novel parameter alters design flexibility and consequently its displacement and required operating DC voltage. In addition to sensing capability, benefitting from FFBR approach, improved imaging resolution is achievable in applications where the device is utilized as a transducer.

In one aspect, the present invention resides in a method comprising: determining a Free to Fixed Boundary Ratio (FFBR) of a reference resonator; determining a reference characteristic of the reference resonator; comparing the reference characteristic to a target characteristic; and fabricating a modified resonator that has a different FFBR than the FFBR of the reference resonator; wherein the FFBR of the modified resonator is selected to provide a modified characteristic of the modified resonator that is closer to the target characteristic than the reference characteristic is to the target characteristic; and wherein the reference resonator and the modified resonator each have a deflectable plate, a fixed substrate, and a cavity defined between the deflectable plate and the fixed substrate.

In some embodiments, the resonator comprises an electromechanical resonator.

Optionally, the resonator comprises at least one of: a Capacitive Micromachined Ultrasonic Transducer (CMUT); a Multiple Moving Membrane Capacitive Micromachined Ultrasonic Transducer (M3-CMUT); a Piezoelectric Micromachined Ultrasonic Transducer (PMUT), a Piezoelectric resonator, a Capacitive resonator, a Microelectromechanical systems (MEMS) piezoelectric ultrasonic transducer, a MEMS sensor, a MEMS transducer, a Mass Resonator Sensor, a MEMS Gas Sensor, a Capacitive-Based Gas Sensor, and a MEMS Resonator.

In some preferred embodiments, the resonator comprises a capacitive-based resonator such as Capacitive Micromachined Ultrasonic Transducer (CMUT).

In some embodiments, the reference characteristic, the target characteristic, and the modified characteristic each comprise: a resonant frequency; a magnitude of displacement of the deflectable plate; a degree of sensitivity; an operating voltage; a surface area of the deflectable plate; an electromechanical coupling coefficient; a mass tolerance; and/or a mass sensitivity.

Optionally, the FFBR of the modified resonator is selected to provide the modified characteristic that is closer to the target characteristic, while maintaining a second characteristic of the modified resonator within a target range relative to a second reference characteristic of the reference resonator.

In some embodiments, the second characteristic of the modified resonator and the second reference characteristic of the reference resonator are substantially the same.

In some embodiments, the second characteristic and the second reference characteristic each comprise: a shape of the deflectable plate; a surface area of the deflectable plate; a perimeter length of the deflectable plate; a width of the deflectable plate; a length of the deflectable plate; a thickness of the deflectable plate; a resonant frequency; a magnitude of displacement of the deflectable plate; a degree of sensitivity; an operating voltage; a mass tolerance; and/or a mass sensitivity.

In another aspect, the present invention resides in a resonator comprising: a deflectable plate; a fixed substrate; and a cavity defined between the deflectable plate and the fixed substrate; wherein a Free to Fixed Boundary Ratio (FFBR) of the top plate is selected to optimize a characteristic of the resonator.

Optionally, the resonator comprises an electromechanical resonator.

In some embodiments, the resonator comprises at least one of: a Capacitive Micromachined Ultrasonic Transducer (CMUT); a Multiple Moving Membrane Capacitive Micromachined Ultrasonic Transducer (M3-CMUT); a Piezoelectric Micromachined Ultrasonic Transducer (PMUT), a Piezoelectric resonator, a Capacitive resonator, a Microelectromechanical systems (MEMS) piezoelectric ultrasonic transducer, a MEMS sensor, a MEMS transducer, a Mass Resonator Sensor, a MEMS Gas Sensor, a Capacitive-Based Gas Sensor, and a MEMS Resonator.

In some preferred embodiments, the resonator comprises a Capacitive Micromachined Ultrasonic Transducer (CMUT).

In some embodiments, the characteristic comprises a resonant frequency; a magnitude of displacement of the deflectable plate; a degree of sensitivity; an operating voltage; a surface area of the deflectable plate; a mass tolerance; and/or a mass sensitivity.

Optionally, the resonator further comprises a sensing material that is attached to the top plate.

In a further aspect, the present invention resides in a method comprising: determining a Free to Fixed Boundary Ratio (FFBR) of a reference Capacitive Micromachined Ultrasonic Transducer (CMUT); determining a resonant frequency of the reference CMUT; comparing the resonant frequency of the reference CMUT to a target resonant frequency; and fabricating a modified CMUT that has a different FFBR than the FFBR of the reference CMUT; wherein, if the resonant frequency of the reference CMUT is lower than the target resonant frequency, the FFBR of the modified CMUT is selected to be smaller than the FFBR of the reference CMUT; and wherein, if the resonant frequency of the reference CMUT is higher than the target resonant frequency, the FFBR of the modified CMUT is selected to be larger than the FFBR of the reference CMUT.

In some embodiments, the reference CMUT and the modified CMUT each have a top membrane with an outer edge; wherein the outer edge has a fixed portion and a free portion; wherein, if the resonant frequency of the reference CMUT is lower than the target resonant frequency, the fixed portion of the outer edge of the modified CMUT is selected to be larger than the fixed portion of the outer edge of the reference CMUT, and/or the free portion of the outer edge of the modified CMUT is selected to be smaller than the free portion of the outer edge of the reference CMUT; and wherein, if the resonant frequency of the reference CMUT is higher than the target resonant frequency, the fixed portion of the outer edge of the modified CMUT is selected to be smaller than the fixed portion of the outer edge of the reference CMUT, and/or the free portion of the outer edge of the modified CMUT is selected to be larger than the free portion of the outer edge of the reference CMUT.

In some embodiments, in the modified CMUT: the fixed portion comprises a first part and a second part; the first part and the second part are of equal length; and the first part and the second part are positioned on opposite sides of the outer edge.

In some embodiments, in the modified CMUT: the fixed portion further comprises a third part and a fourth part; the first part, the second part, the third part, and the fourth part are of equal length; and the first part, the second part, the third part, and the fourth part are positioned symmetrically about the outer edge. The modified CMUT can have any number of fixed portion at the edge, positioned symmetrically or asymmetrically across the surrounding of the membrane.

Optionally, in both the reference CMUT and the modified CMUT, the top membrane is circular.

In some embodiments, the top membrane of the modified CMUT and the top membrane of the reference CMUT have an identical size and shape.

Optionally, in both the reference device and the modified device, the top membrane has a center portion with at least two symmetrically arranged arms that extend radially outwardly from the center portion.

In some embodiments, each of the at least two symmetrically arranged arms has a radially outwardly facing edge that spans a width of the arm; and wherein, in both the reference device and the modified device, the fixed portion comprises the radially outwardly facing edges of the at least two symmetrically arranged arms.

In some embodiments, in the modified device, the free portion comprises an edge of the center portion.

In some embodiments, if the resonant frequency of the reference device is lower than the target resonant frequency, the widths of the at least one symmetrically arranged arms of the modified device are selected to be larger than the widths of the at least one symmetrically arranged arms of the reference device; and wherein, if the resonant frequency of the reference device is higher than the target resonant frequency, the widths of the at least one symmetrically arranged arms of the modified device are selected to be smaller than the widths of the at least one symmetrically arranged arms of the reference device.

Optionally, the center portion of the top membrane of the modified device and the center portion of the top membrane of the reference device have an identical size and shape.

Optionally, in both the reference device and the modified device, the center portion is circular.

In some embodiments, in both the reference device and the modified device, the at least two symmetrically arranged arms comprise four symmetrically arranged arms.

In some embodiments, the FFBR of the modified device is larger than 0.

In some embodiments, the FFBR of the modified device is in a range from 0.5 to 8. The modified topology can have any FFBR value resulting from any number of fixed portion of the membrane edge, positioned symmetrically or asymmetrically across the surrounding of the edge of the membrane.

In a further aspect, the present invention resides in a method comprising: determining a Free to Fixed Boundary Ratio (FFBR) of a reference Capacitive Micromachined Ultrasonic Transducer (CMUT); determining a displacement of the reference CMUT; comparing the displacement of the reference CMUT to a target displacement; and fabricating a modified CMUT that has a different FFBR than the FFBR of the reference CMUT; wherein, if the displacement of the reference CMUT is lower than the target displacement, the FFBR of the modified CMUT is selected to be larger than the FFBR of the reference CMUT; and wherein, if the displacement of the reference CMUT is higher than the target displacement, the FFBR of the modified CMUT is selected to be smaller than the FFBR of the reference CMUT.

In a further aspect, the present invention resides in a method comprising: determining a Free to Fixed Boundary Ratio (FFBR) of a reference Capacitive Micromachined Ultrasonic Transducer (CMUT); determining a mass sensitivity of the reference CMUT; comparing the mass sensitivity of the reference CMUT to a target mass sensitivity; and fabricating a modified CMUT that has a different FFBR than the FFBR of the reference CMUT; wherein the FFBR of the modified CMUT is selected to provide a mass sensitivity that is closer to the target mass sensitivity than the mass sensitivity of the reference CMUT is to the target mass sensitivity.

In a further aspect, the present invention resides in a Capacitive Micromachined Ultrasonic Transducer (CMUT) comprising a top membrane, a bottom substrate, and a cavity defined therebetween; wherein a Free to Fixed Boundary Ratio (FFBR) of the top membrane is selected to improve or optimize a characteristic of the CMUT.

Optionally, the characteristic comprises a resonant frequency; a displacement; and/or a mass sensitivity.

In another aspect, the present invention resides in a Capacitive Micromachined Ultrasonic Transducer (CMUT) comprising a top membrane, a bottom substrate, and a cavity defined therebetween; wherein the top membrane is circular and has an outer edge, and the outer edge has a fixed portion and a free portion. In other embodiments, the top membrane can have any shape.

In some embodiments, the fixed portion comprises a first part and a second part; wherein the first part and the second part are of equal length; and wherein the first part and the second part are positioned on opposite sides of the outer edge.

Optionally, the fixed portion further comprises a third part and a fourth part; wherein the first part, the second part, the third part, and the fourth part are of equal length; and wherein the first part, the second part, the third part, and the fourth part are positioned symmetrically about the outer edge. The FFBR approach can be applied to any size and shape of the membrane(s) wherein the membrane(s) are symmetrically or asymmetrically fixed at the surrounding.

In a further aspect, the present invention resides in a Capacitive Micromachined Ultrasonic Transducer (CMUT) comprising a top membrane, a bottom substrate, and a cavity defined therebetween; wherein the top membrane has an outer edge with a fixed portion and a free portion; wherein the top membrane has a center portion with at least two symmetrically arranged arms that extend radially outwardly from the center portion; and wherein the center portion is circular. The arms could also be arranged asymmetrically.

In some embodiments, each of the at least two symmetrically arranged arms has a radially outwardly facing edge that spans a width of the arm; and wherein the fixed portion comprises the radially outwardly facing edges of the at least two symmetrically arranged arms. The arms could also be arranged asymmetrically.

In some embodiments, the free portion comprises an edge of the center portion.

Optionally, the at least two symmetrically arranged arms comprise four symmetrically arranged arms.

In some embodiments, the top membrane has a Free to Fixed Boundary Ratio (FFBR) that is larger than 0.

In some embodiments, the FFBR is in a range from 0.5 to 8. The modified topology can have any FFBR value resulting from any number of fixed portion of the membrane edge, positioned symmetrically or asymmetrically across the surrounding of the edge of the membrane.

Preferably, a Free to Fixed Boundary Ratio (FFBR) of the top membrane is selected to optimize a characteristic of the CMUT.

Optionally, the characteristic comprises a resonant frequency; a displacement; an electromechanical coupling coefficient; and/or a mass sensitivity.

In some embodiments, the CMUT further comprises a sensing material that is attached to the top membrane.

In a further aspect, the present invention resides in a method comprising: determining a Free to Fixed Boundary Ratio (FFBR) of a reference Capacitive Micromachined Ultrasonic Transducer (CMUT); determining a characteristic of the reference CMUT; comparing the characteristic of the reference CMUT to a target characteristic; and fabricating a modified CMUT that has a different FFBR than the FFBR of the reference CMUT; wherein the FFBR of the modified CMUT is selected to provide a characteristic that is closer to the target characteristic than the characteristic of the reference CMUT is to the target characteristic.

Optionally, the characteristic is an operating voltage, and wherein the target characteristic is a target operating voltage.

In some embodiments, the FFBR of the modified CMUT is selected to provide the operating voltage that is closer to the target operating voltage, while maintaining a second characteristic of the modified CMUT within a target range for the second characteristic.

Optionally, the second characteristic comprises a resonant frequency.

In some embodiments, if the operating voltage of the reference CMUT is higher than the target operating voltage, the FFBR of the modified CMUT is selected to be larger than the FFBR of the reference CMUT; and wherein, if the operating voltage of the reference CMUT is lower than the target operating voltage, the FFBR of the modified CMUT is selected to be smaller than the FFBR of the reference CMUT.

In another aspect, the present invention resides in a method comprising: determining a Free to Fixed Boundary Ratio (FFBR) of a reference device; determining a reference characteristic of the reference device; comparing the reference characteristic to a target characteristic; and fabricating a modified device that has a different FFBR than the FFBR of the reference device; wherein the FFBR of the modified device is selected to provide a modified characteristic of the modified device that is closer to the target characteristic than the reference characteristic is to the target characteristic;

wherein the reference device and the modified device each have at least one deflectable membrane, a fixed substrate, and at least one cavity defined between the at least one deflectable membrane and the fixed substrate; and wherein the reference device and the modified device each comprise at least one of: a resonator and a transducer.

In some embodiments, the reference device and the modified device each comprise an electromechanical resonator.

In some embodiments, the reference device and the modified device each comprise at least one of: a Capacitive Micromachined Ultrasonic Transducer (CMUT); a Multiple Moving Membrane Capacitive Micromachined Ultrasonic Transducer (M3-CMUT); a Piezoelectric Micromachined Ultrasonic Transducer (PMUT), a Piezoelectric resonator, a Capacitive resonator, a Microelectromechanical systems (MEMS) piezoelectric ultrasonic transducer, a MEMS sensor, a MEMS transducer, a Mass Resonator Sensor, a MEMS Gas Sensor, a Capacitive-Based Gas Sensor, and a MEMS Resonator.

In some embodiments, the reference device and the modified device each comprise a Capacitive Micromachined Ultrasonic Transducer (CMUT).

In some embodiments, the reference characteristic, the target characteristic, and the modified characteristic each comprise a resonant frequency.

In some embodiments, the reference characteristic, the target characteristic, and the modified characteristic each comprise a magnitude of displacement of the at least one deflectable membrane.

In some embodiments, the reference characteristic, the target characteristic, and the modified characteristic each comprise a degree of sensitivity.

In some embodiments, the reference characteristic, the target characteristic, and the modified characteristic each comprise an operating voltage.

In some embodiments, the reference characteristic, the target characteristic, and the modified characteristic each comprise a surface area of the at least one deflectable membrane.

In some embodiments, the reference characteristic, the target characteristic, and the modified characteristic each comprise a mass tolerance.

In some embodiments, the reference characteristic, the target characteristic, and the modified characteristic each comprise a mass sensitivity.

In some embodiments, the FFBR of the modified device is selected to provide the modified characteristic that is closer to the target characteristic, while maintaining a second characteristic of the modified device within a target range relative to a second reference characteristic of the reference device.

In some embodiments, the second characteristic of the modified device and the second reference characteristic of the reference device are substantially the same.

In some embodiments, the second characteristic and the second reference characteristic each comprise a shape of the at least one deflectable membrane.

In some embodiments, the second characteristic and the second reference characteristic each comprise a surface area of the at least one deflectable membrane.

In some embodiments, the second characteristic and the second reference characteristic each comprise a perimeter length of the at least one deflectable membrane.

In some embodiments, the second characteristic and the second reference characteristic each comprise a width of the at least one deflectable membrane.

In some embodiments, the second characteristic and the second reference characteristic each comprise a length of the at least one deflectable membrane.

In some embodiments, the second characteristic and the second reference characteristic each comprise a thickness of the at least one deflectable membrane.

In some embodiments, the second characteristic and the second reference characteristic each comprise a resonant frequency.

In some embodiments, the second characteristic and the second reference characteristic each comprise a magnitude of displacement of the at least one deflectable membrane.

In some embodiments, the second characteristic and the second reference characteristic each comprise a shape of the at least one deflectable membrane.

In some embodiments, the second characteristic and the second reference characteristic each comprise a degree of sensitivity.

In some embodiments, the second characteristic and the second reference characteristic each comprise an operating voltage.

In some embodiments, the second characteristic and the second reference characteristic each comprise a mass tolerance.

In some embodiments, the second characteristic and the second reference characteristic each comprise a mass sensitivity.

In another aspect, the present invention resides in a device comprising: at least one deflectable membrane; a fixed substrate; and at least one cavity defined between the at least one deflectable membrane and the fixed substrate; wherein a Free to Fixed Boundary Ratio (FFBR) of the at least one membrane is selected to optimize a characteristic of the device; and wherein the device comprises at least one of: a resonator and a transducer.

In some embodiments, the device further comprises a sensing material that is attached to the at least one deflectable membrane.

BRIEF DESCRIPTION OF THE DRAWINGS

Further aspects and advantages of the invention will appear from the following description taken together with the accompanying drawings, in which.

DETAILED DESCRIPTION OF THE DRAWINGS

Figure 1:
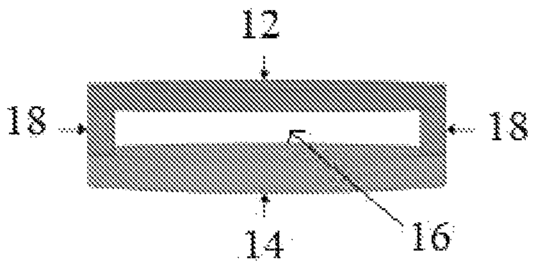
FIG. 1 is a schematic side view of a fully clamped conventional circular CMUT (as a transducer)
Figure 2:
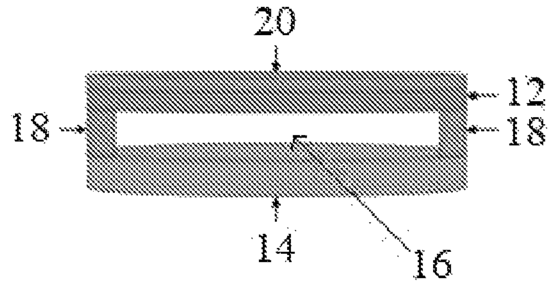
FIG. 2 is a schematic side view of a fully clamped conventional circular CMUT (as a gas sensor)
Figure 3:
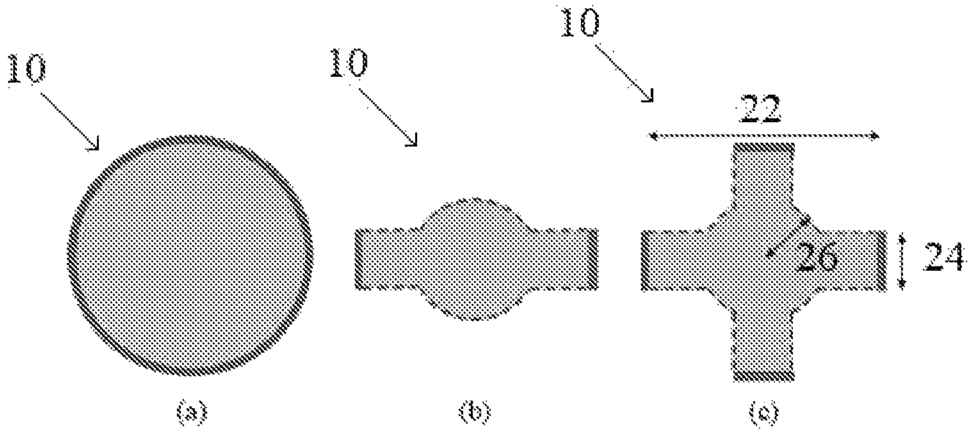
FIG. 3 is a schematic top view of the example structures utilizing novel FFBR, (a) conventional circular CMUT, which is fully clamped at the surrounding, (b) proposed Greek Bridge clamped at the arms' width and (c) proposed Greek Cross clamped at the arms' width.

A schematic top view of the proposed devices 10, which present the FFBR approach, is illustrated in FIG. 3. Conventional clamped CMUT (a), proposed Greek Bridge (b) and Greek Cross (c) are depicted in FIG. 3 where fixed boundaries are shown in solid and dashed lines define free boundaries of the proposed topologies. In FIG. 3, the total length is represented by numeral 22, the arm's width is represented by numeral 24, and the radius is represented by numeral 26.

Figure 4:
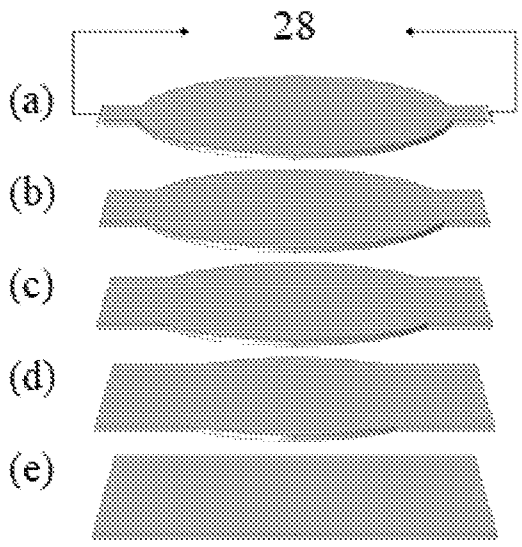
FIG. 4 shows utilizing the proposed FFBR approach in developed Greek Bridge structure designed and analyzed in COMSOL Multiphysics.

The FFBR parameter is proposed and analyzed for several developed devices, utilizing COMSOL Multiphysics software for Finite Element Analysis (FEA). Greek Bridge geometry is proposed and built in COMSOL Multiphysics where proposed FFBR approach is utilized, as illustrated in FIG. 4. In this structure total length and radius of the circular geometry in the middle are constant at 120 μm and 50 μm, respectively. The FFBR parameter for Greek Bridge is considered as an example 1.2 (e), 1.5 (d), 2.2 (c), 3.6 (b) and 7.9 (a) when width of the structure is altered between 20 μm and 100 μm. Parameters of the analyzed Greek Bridge are shown in Table 1. The fixed boundaries are represented by numeral 28.

TABLE 1

Design parameters of the proposed and simulated Greek Bridge structure.

| Parameter | Dimension |
|---|---|
| Total length | 120 μm |
| Radius | 50 μm |
| Thickness | 1.5 μm |
| Cavity Height | 750 nm |
| Arms' Width | 20, 40, 60, 80, 100 μm |
| DC Voltage | 20 V |

Figure 5:
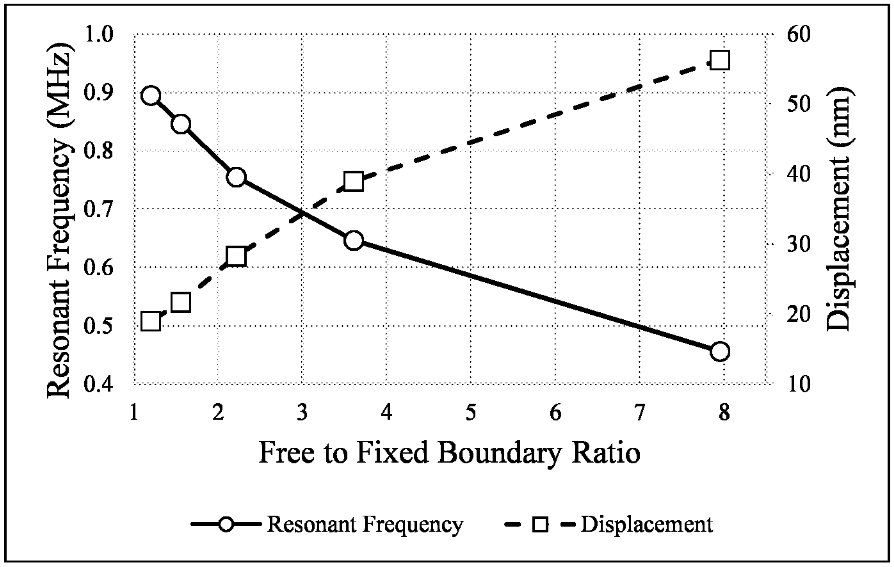
FIG. 5 shows frequency (MHz) vs FFBR for Greek Bridge structure. As examples of FFBR, FFBR parameter is investigated for values as 1.2, 1.5, 2.2, 3.6 and 7.9 for a Greek Bridge with 120 μm total length, 50 μm radius, 750 nm cavity height, 1.5 μm thickness when arm's width is altered from 20 μm to 100 μm range. In this example, the structure is biased with 20 V DC.

FIG. 5 depicts a plot of the resonant frequency and displacement against the FFBR parameter values for the proposed Greek Bridge structure. This shows the FFBR plays a significant role in determining the operating frequency of the design. As illustrated in FIG. 5, increasing FFBR from 1.2 to 7.9 as an example, can decrease the resonant frequency by more than 90%. According to Equation (1), higher masses contribute to lower resonant frequencies. However, utilizing the FFBR in the design criteria as illustrated in FIG. 5, shows that although mass is higher for lower FFBR values, resonant frequency is also increased in the Greek Bridge structure. In addition, displacement of the structure increases for higher FFBRs meaning that this approach increases the design degree of freedom, which results in higher displacement. This can further reduce the required operating DC voltage of the device. The obtained results based on utilization of FFBR indicate that this parameter can significantly affect the resonant frequency and therefore improves the device performance.

Figure 6:
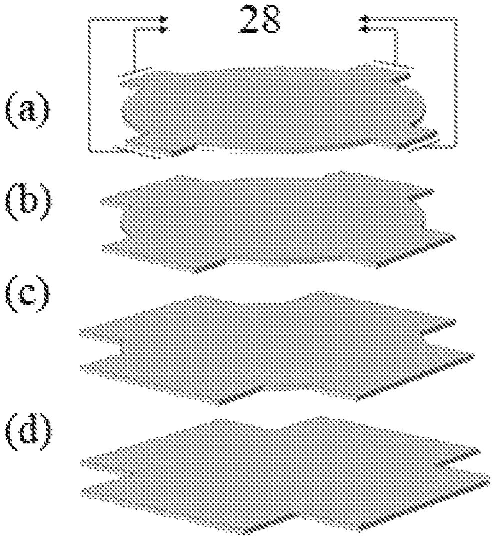
FIG. 6 shows utilizing the proposed free to fixed boundary ratio in proposed Greek Cross geometry designed in COMSOL Multiphysics.

To investigate the concept of FFBR, Greek Cross structure is also proposed with multiple FFBRs, as shown in FIG. 6. This structure can benefit from multiple symmetrical or asymmetrical clamped areas, which increases the robustness of the structure.

In this analysis total length and radius of the circular geometry in the middle are constant at 120 μm and 50 μm, respectively. The novel FFBR parameter is considered in designing Greek Cross structure as 0.7 (d), 0.9 (c), 1.6 (b) and 4 (a) as examples of FFBR when width of the structure is altered between 20 μm and 100 μm. Parameters of the analyzed Greek Cross are shown in Table 2.

TABLE 2

Design parameters of the proposed and simulated Greek Cross structure as an example of a topology which utilizes FFBR.

| Parameter | Dimension |
|---|---|
| Total length | 120 μm |
| Radius | 50 μm |
| Thickness | 1.5 μm |
| Cavity Height | 750 nm |
| Arms' Width | 20, 40, 60, 70 μm |
| DC Voltage | 20 V |

Figure 7:
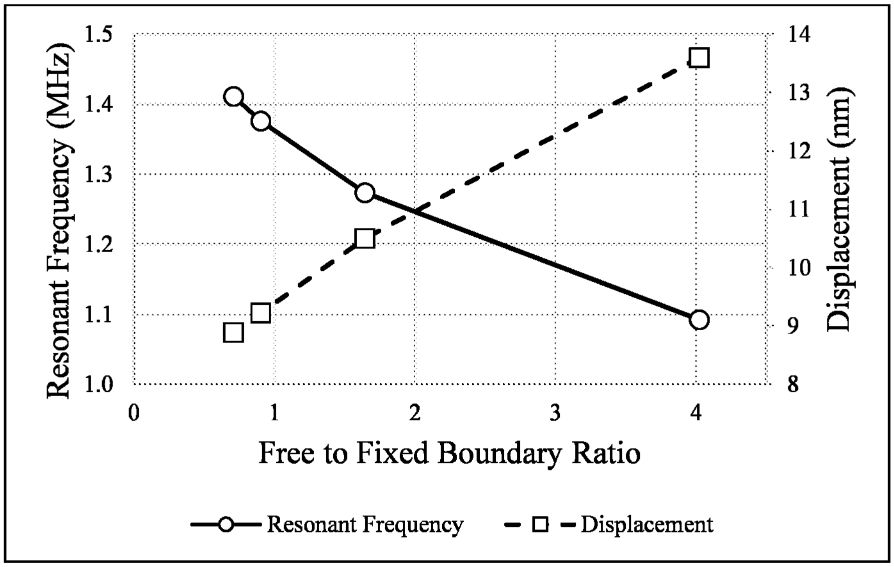
FIG. 7 shows frequency (MHz) vs FFBR for Greek Cross structure. FFBR values 0.7, 0.9, 1.6 and 4 are investigated as FFBR examples for a Greek Cross with 120 μm total length, 50 μm radius, 750 nm cavity height, 1.5 μm thickness when arm's width is altered within 20 μm and 100 μm range. The structure is biased with 20 V DC.

Resonant frequency versus the FFBR parameter, is illustrated in FIG. 6 for developed Greek Cross structure where FFBR is altered between 0.7 (d), 0.9 (c), 1.6 (b), and 4 (a), as examples of FFBR and the proposed topology which utilizes FFBR parameter. As shown in FIG. 7, this parameter is a critical design factor due to its significant effect on the resonant frequency. This analysis shows that resonant frequency is dropped more than 30% for Greek Cross when the FFBR is increased to 4. Similar to the Greek Bridge, FFBR also adds to the design degree of freedom, hence displacement increases for higher FFBR values. This ratio can also be utilized as a control factor on operating DC voltage of the device for any application.

Figure 8:
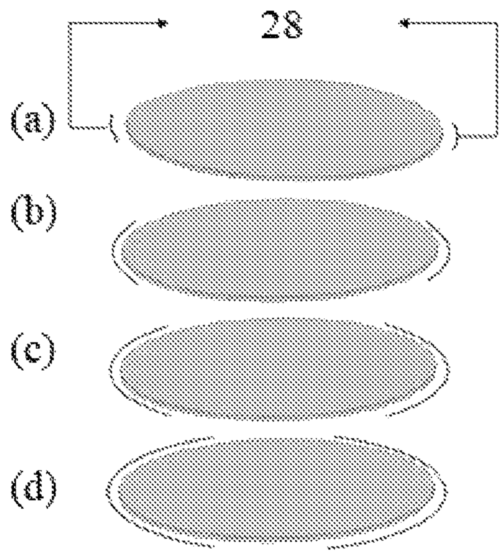
FIG. 8 shows utilizing the proposed FFBR in circular geometry designed in COMSOL Multiphysics. As an example, the structure is symmetrically clamped at two positions, however, the topology can be symmetrically or asymmetrically clamped at any number of the clamped edges.

FFBR is also shown as a critical design parameter in circular structures. As illustrated in FIG. 8, circular geometries with multiple FFBRs are built and simulated in COMSOL Multiphysics. Fixed boundaries are considered symmetrically as an example at two positions across the structure with FFBR ratios such as values of 0.5 (d), 1 (c), 2 (b), and 5 (a). Design parameters of the structure are illustrated below in Table 3.

TABLE 3

Design parameters of the simulated circular geometry.

| Parameter | Dimension |
|---|---|
| Radius | 60 μm |
| Thickness | 1.5 μm |
| Cavity Height | 750 nm |
| DC Voltage | 20 V |

Figure 9:
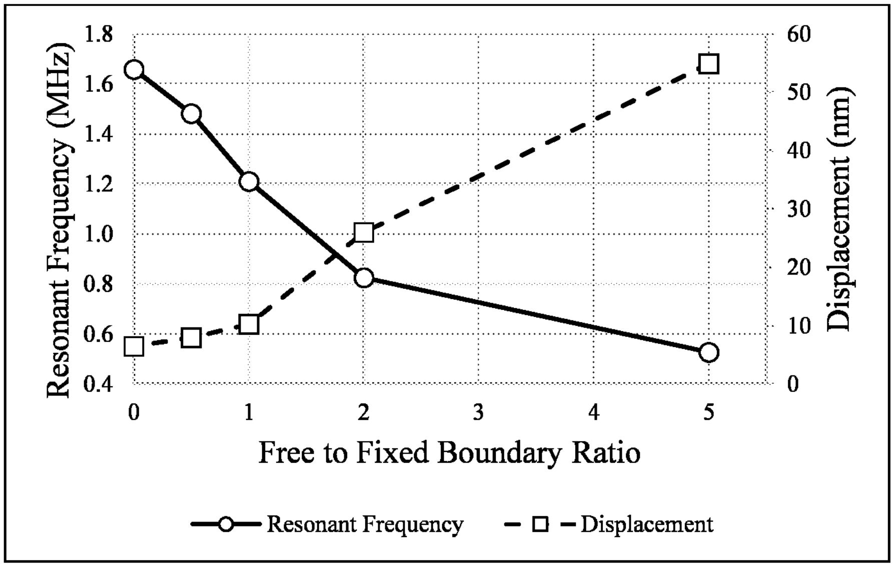
FIG. 9 shows frequency (MHz) vs FFBR for circular structure where it is symmetrically clamped at two positions as an example of utilizing FFBR. FFBR values 0, 0.5, 1, 2 and 5 are investigated as examples for a circular structure with 120 μm diameter, 750 nm cavity height and 1.5 μm thickness. The structure is biased with 20 V DC.

As depicted in FIG. 9, FFBR significantly affects the resonant frequency of the circular geometry, which is clamped at two symmetric positions. The plot shows that although mass and other conventional parameters of the structure remain constant, increasing FFBR from zero (conventional fully clamped circular structure) to five decreases the resonant frequency by 200%. Furthermore, displacement of this structure is significantly increased due to the utilized FFBR approach, which can be employed to improve performance of the device and decrease the required operating DC voltage.

Figure 10:
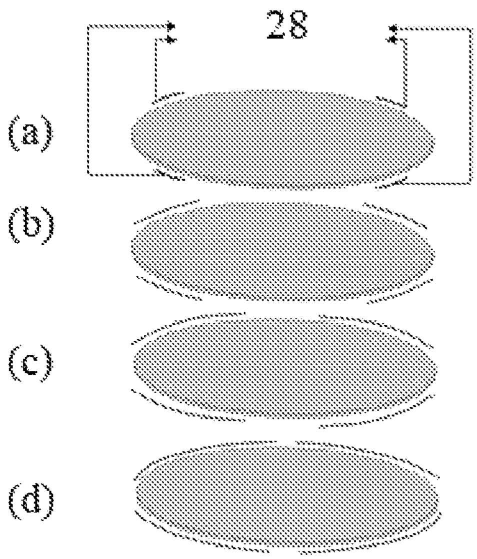
FIG. 10 shows utilizing the FFBR in circular geometry designed in COMSOL Multiphysics. The resonator can be symmetrically or asymmetrically clamped. As an example, the structure is symmetrically clamped at four positions.

This investigation is further followed by altering the configuration of the clamped area in the above circular geometry, as shown in FIG. 10. The same FFBR, namely 0.5 (d), 1 (c), 2 (b), and 5 (a), is utilized where boundaries are symmetrically fixed at four positions, illustrated in FIG. 10.

Figure 11:
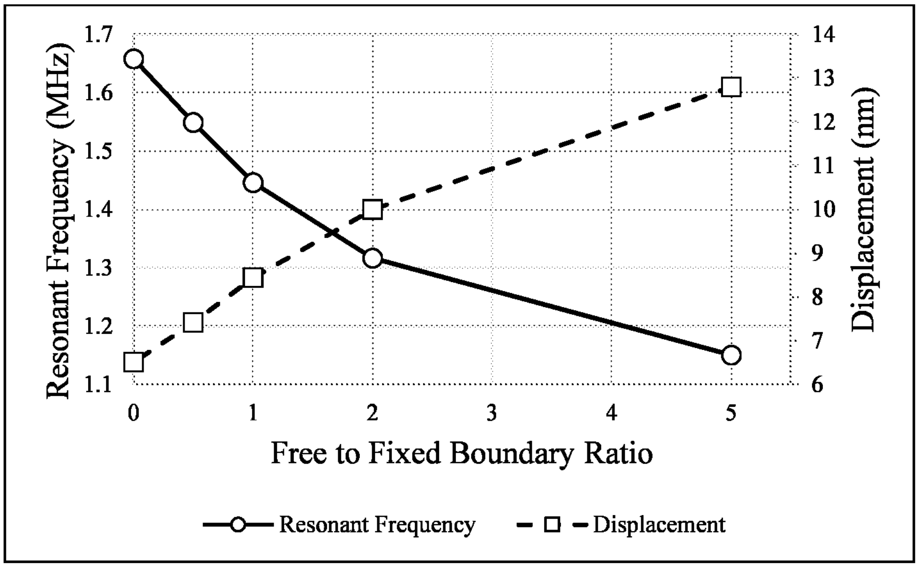
FIG. 11 shows frequency (MHz) vs FFBR for circular structure where it is symmetrically clamped at four positions. FFBR values 0, 0.5, 1, 2 and 5 for a circular structure with 120 μm diameter, 750 nm cavity height and 1.5 μm thickness. The structure is biased with 20 V DC.

Utilizing FEA shown in FIG. 11, indicates that resonant frequency is also affected by position of the clamped areas. As illustrated in FIG. 11, it is affected by 44% when FFBR parameter is altered from zero to five. Furthermore, the new configuration of the clamping area reduced the change in the structure's displacement from more than 40 nm where it was clamped at two positions, to 6 nm where clamping is doubled for the identical FFBRs.

Above analysis indicates that the FFBR and clamping area configuration can be utilized in design process due to the substantial effect on resonant frequency and displacement. This finding shows that FFBR can significantly contribute to sensitivity and performance enhancement of the device. As an example, utilizing FFBR in mass sensing applications provides a critical tool to determine the region of opportunity that provides maximum frequency shift for different areas of the device.

Figure 12:
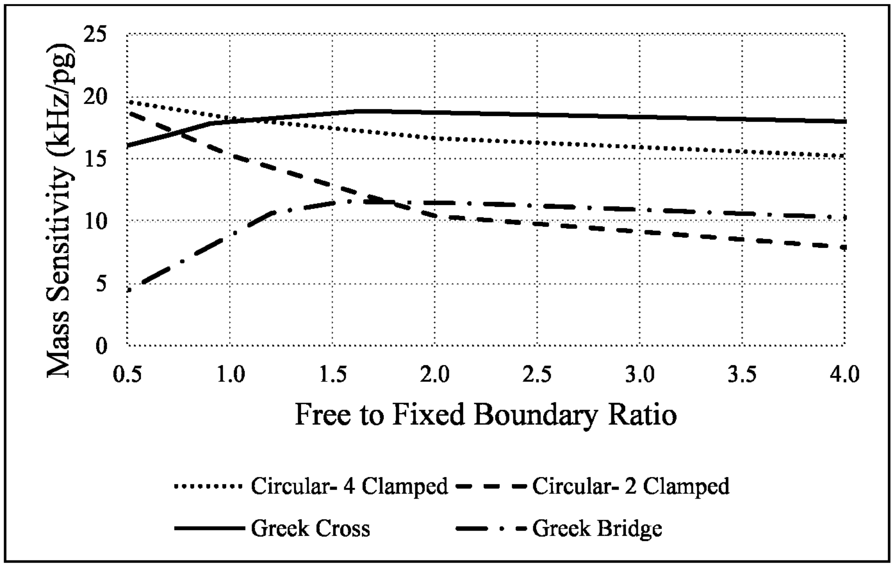
FIG. 12 shows mass sensitivity (kHz/pg) vs FFBR for Greek Bridge, Greek Cross and circular structure with 120 μm total length or diameter. The circular structures are symmetrically clamped at two and four positions. Cavity height, thickness and applied DC voltage are considered 750 nm, 1.5 μm and 20 V, respectively.

Mass sensitivity versus FFBR is shown in FIG. 12 for devices such as circular geometry clamped at two and four positions, Greek Cross and Greek Bridge structures. In this analysis, 0.027 μg mass is considered per unit area when conducting FEA analysis. Thickness, cavity height, diameter or total length are considered 1.5 μm, 750 nm, 120 μm as an example when 20 V DC is applied to the structures. FIG. 12 depicts that utilizing the FFBR approach provides valuable information where optimization of important factors such as mass sensitivity is required.

Figure 13:
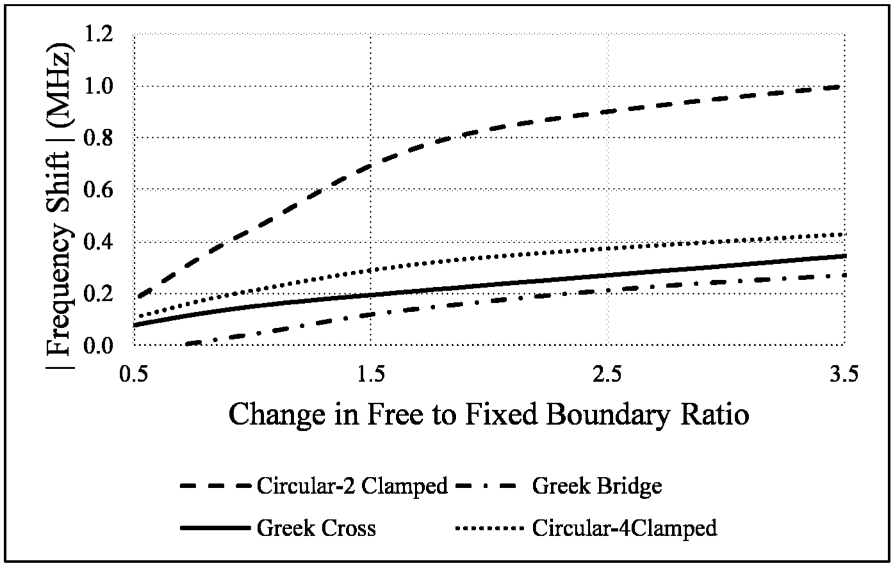
FIG. 13 shows magnitude of frequency shift versus change in FFBR for circular structures clamped at two and four positions, Greek Bridge and Greek Cross. Total length or diameter, thickness, cavity height and DC voltage are 120 μm, 1.5 μm, 750 nm and 20V, respectively.

Magnitude of frequency shift versus change in FFBR is illustrated in FIG. 13 for structures including clamped circular at two and four positions, Greek Bridge and Greek Cross. The slope of this graph indicates the sensitivity of resonant frequency to change in FFBR parameter for proposed devices as examples of devices which utilizes FFBR approach.

Figure 14:
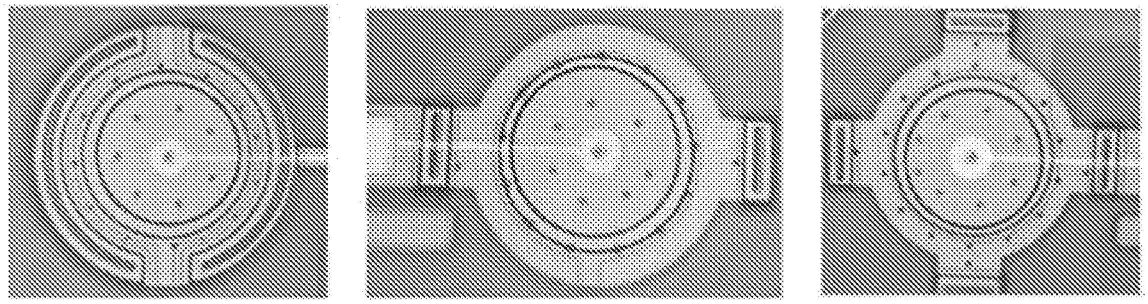
FIG. 14 shows designed and fabricated (a) conventional CMUT, (b) Greek Bridge and (c) Greek Cross, which utilizes FFBR approach.

The FFBR factor was utilized to propose and fabricate proof-of-concept Greek Cross (c) and Greek Bridge (b) structures in addition to the conventional clamped circular structure (a), as shown in FIG. 14. Any technique such as sacrificial and wafer bonding can be utilized for fabrication, however, PolyMUMPs sacrificial technique was used at this step as a commercially available and low-cost microfabrication technique. The fabrication process may or may not use holes on the structures and may consist of different fabrication steps and processes.

A top view of the designed and fabricated conventional CMUT which is fully clamped at the surrounding, is shown in FIG. 14(*a*). Greek Bridge shown in (b) is designed and fabricated utilizing the proposed FFBR approach to obtain higher sensitivity. Furthermore, Greek Cross shown in (c), which benefits from a significantly lower mass compared to conventional CMUT with similar dimensions, is designed and fabricated as a more robust structure compared to Greek Bridge. In addition, lower FFBR in Greek Bridge and Greek Cross in comparison with conventional CMUT, provide more flexibility as also analyzed in COMSOL Multiphysics to improve displacement.

It will be understood that, although various features of the invention have been described with respect to one or another of the embodiments of the invention, the various features and embodiments of the invention may be combined or used in conjunction with other features and embodiments of the invention as described and illustrated herein.

The present invention can be used for designing and fabricating resonators and/or transducers, such as CMUTs, having desired characteristics, such as resonant frequency, mass sensitivity, displacement, electromechanical coupling coefficient, robustness, surface area, and voltage. The invention is not limited to the particular structures and topologies shown and described, which are provided as examples only. Rather, any suitable topology, shape and size of the membrane(s) could be used, with the FFBR approach being used to optimize one or more characteristics of the devices. The FFBR approach may be used, for example, to modify a reference device design to increase the surface area without altering the resonant frequency, or to increase the mass sensitivity while maintaining the size and shape of the top membrane(s). The invention is not limited to the particular voltages used in the examples. Rather, any suitable voltage could be used.

The invention is not limited to any particular materials or techniques for fabricating the resonators and/or transducers and/or CMUTs. Any suitable materials and techniques known to a person skilled in the art could be employed.

The invention is not limited to any particular uses of the resonators and/or transducers and/or CMUTs. Rather, the resonators/transducers/CMUTs could be designed and used for any suitable purpose, such as for sensing analytes in a gas or liquid, for ultrasonic imaging, or for other uses.

Although the invention has been described in the preferred embodiments as pertaining to CMUTs, the invention could also be used with other types of resonators and/or transducers as well. That is, the FFBR approach could be used to optimize the performance and/or characteristics of any resonator and/or transducer having a deflectable membrane/plate, a fixed substrate, and a cavity defined therebetween. The invention could be used, for example, with Piezoelectric Micromachined Ultrasonic Transducers (PMUTs), Piezoelectric resonators, Capacitive resonators, Microelectromechanical systems (MEMS) piezoelectric ultrasonic transducers, MEMS sensors, MEMS transducers, Mass Resonator Sensors, MEMS Gas Sensors, Capacitive-Based Gas Sensors, and/or MEMS Resonators.

In some embodiments of the invention, the position of the fixed portion or portions of the top membrane/plate can be adjusted, in addition to or in place of adjusting the FFBR, in order to alter various characteristics of the resonators, such as resonant frequency, displacement, operating voltage, mass sensitivity, and mass tolerance.

Although this disclosure has described and illustrated certain preferred embodiments of the invention, it is to be understood that the invention is not restricted to these particular embodiments. Rather, the invention includes all embodiments which are functional, electrical, electromagnetic, or mechanical equivalents of the specific embodiments and features that have been described and illustrated herein.

We claim:

1. A method comprising:

determining a Free to Fixed Boundary Ratio (FFBR) of a reference device;

determining a reference characteristic of the reference device;

comparing the reference characteristic to a target characteristic; and fabricating a modified device that has a different FFBR than the FFBR of the reference device;

wherein the FFBR of the modified device is selected to provide a modified characteristic of the modified device that is closer to the target characteristic than the reference characteristic is to the target characteristic;

wherein the reference device and the modified device each have at least one deflectable membrane, a fixed substrate, and at least one cavity defined between the at least one deflectable membrane and the fixed substrate; and wherein the reference device and the modified device each comprise at least one of: a resonator and a transducer.

2. The method according to claim 1, wherein the reference device and the modified device each comprise an electromechanical resonator.

3. The method according to claim 1, wherein the reference device and the modified device each comprise at least one of: a Capacitive Micromachined Ultrasonic Transducer (CMUT); a Multiple Moving Membrane Capacitive Micromachined Ultrasonic Transducer (M3-CMUT); a Piezoelectric Micromachined Ultrasonic Transducer (PMUT), a Piezoelectric resonator, a Capacitive resonator, a Microelectromechanical systems (MEMS) piezoelectric ultrasonic transducer, a MEMS sensor, a MEMS transducer, a Mass Resonator Sensor, a MEMS Gas Sensor, a Capacitive-Based Gas Sensor, and a MEMS Resonator.

4. The method according to claim 1, wherein the reference device and the modified device each comprise a Capacitive Micromachined Ultrasonic Transducer (CMUT).

5. The method according to claim 1, wherein the reference characteristic, the target characteristic, and the modified characteristic each comprise a resonant frequency.

6. The method according to claim 1, wherein the reference characteristic, the target characteristic, and the modified characteristic each comprise a magnitude of displacement of the at least one deflectable membrane.

7. The method according to claim 1, wherein the reference characteristic, the target characteristic, and the modified characteristic each comprise a degree of sensitivity.

8. The method according to claim 1, wherein the reference characteristic, the target characteristic, and the modified characteristic each comprise an operating voltage.

9. The method according to claim 1, wherein the reference characteristic, the target characteristic, and the modified characteristic each comprise a surface area of the at least one deflectable membrane.

10. The method according to claim 1, wherein the reference characteristic, the target characteristic, and the modified characteristic each comprise a mass tolerance.

11. The method according to claim 1, wherein the reference characteristic, the target characteristic, and the modified characteristic each comprise a mass sensitivity.

12. The method according to claim 1, wherein the reference characteristic, the target characteristic, and the modified characteristic each comprise an electromechanical coupling coefficient.

13. The method according to claim 1, wherein the FFBR of the modified device is selected to provide the modified characteristic that is closer to the target characteristic, while maintaining a second characteristic of the modified device within a target range relative to a second reference characteristic of the reference device.

14. The method according to claim 13, wherein the second characteristic of the modified device and the second reference characteristic of the reference device are substantially the same.

15. The method according to claim 13, wherein the second characteristic and the second reference characteristic each comprise at least one of:

a shape of the at least one deflectable membrane;

a surface area of the at least one deflectable membrane;

a perimeter length of the at least one deflectable membrane;

a width of the at least one deflectable membrane;

a length of the at least one deflectable membrane;

a thickness of the at least one deflectable membrane;

a resonant frequency;

a magnitude of displacement of the at least one deflectable membrane;

a shape of the at least one deflectable membrane;

a degree of sensitivity;

an operating voltage;

a mass tolerance; and a mass sensitivity.

16. A device comprising:

at least one deflectable membrane;

a fixed substrate; and at least one cavity defined between the at least one deflectable membrane and the fixed substrate;

wherein a Free to Fixed Boundary Ratio (FFBR) of the at least one membrane is selected to optimize a characteristic of the device; and wherein the device comprises at least one of: a resonator and a transducer.

17. The device according to claim 16, wherein the device comprises an electromechanical resonator.

18. The device according to claim 16, wherein the device comprises at least one of: a Capacitive Micromachined Ultrasonic Transducer (CMUT); a Multiple Moving Membrane Capacitive Micromachined Ultrasonic Transducer (M3-CMUT); a Piezoelectric Micromachined Ultrasonic Transducer (PMUT), a Piezoelectric resonator, a Capacitive resonator, a Microelectromechanical systems (MEMS)

piezoelectric ultrasonic transducer, a MEMS sensor, a MEMS transducer, a Mass Resonator Sensor, a MEMS Gas Sensor, a Capacitive-Based Gas Sensor, and a MEMS Resonator.

19. The device according to claim 16, wherein the characteristic comprises at least one of:

a resonant frequency;

a magnitude of displacement of the at least one deflectable membrane;

a degree of sensitivity;

an operating voltage;

a surface area of the at least one deflectable membrane;

a mass tolerance;

a mass sensitivity; and an electromechanical coupling coefficient.

20. The device according to claim 16, further comprising a sensing material that is attached to the at least one deflectable membrane.

* * * * *